(12) United States Patent
Rønnau (10) Patent No.: US 7,656,300 B2
(45) Date of Patent: Feb. 2, 2010

(54) PEST CONTROL SYSTEM

(75) Inventor: Per Rønnau, Højbjerg (DK)

(73) Assignee: Rønnau Development ApS, Højbjerg (DK)

( * ) Notice: Subject to any disclaimer, the term of this patent is extended or adjusted under 35 U.S.C. 154(b) by 176 days.

(21) Appl. No.: 10/560,699

(22) PCT Filed: Jun. 16, 2004

(86) PCT No.: PCT/DK2004/000418

§ 371 (c)(1),
(2), (4) Date: Dec. 30, 2005

(87) PCT Pub. No.: WO2004/110142

PCT Pub. Date: Dec. 23, 2004

(65) Prior Publication Data
US 2006/0150470 A1      Jul. 13, 2006

(30) Foreign Application Priority Data
Jun. 16, 2003    (DK) ................................ 2003 00890

(51) Int. Cl.
*G08B 23/00* (2006.01)
(52) U.S. Cl. ................. 340/573.2; 340/506; 340/539.1; 340/539.18; 340/539.25; 340/573.1; 340/573.3; 340/565; 340/567
(58) Field of Classification Search ............. 340/573.3, 340/573.2, 562, 563; 43/61, 107, 114
See application file for complete search history.

(56) References Cited

U.S. PATENT DOCUMENTS

| | | | | |
|---|---|---|---|---|
| 4,884,064 A | * | 11/1989 | Meehan ..................... | 340/573.2 |
| 5,396,729 A | * | 3/1995 | Vejvoda ....................... | 43/114 |
| 6,104,294 A | * | 8/2000 | Andersson et al. ........ | 340/573.3 |
| 6,385,544 B1 | | 5/2002 | Mafra-Neto ................... | 702/5 |
| 6,445,301 B1 | * | 9/2002 | Farrell et al. ............. | 340/573.2 |
| 6,493,363 B1 | * | 12/2002 | Shuman et al. ............. | 370/539 |
| 6,792,395 B2 | * | 9/2004 | Roberts ...................... | 702/188 |
| 6,885,299 B2 | * | 4/2005 | Cooper et al. .......... | 340/539.26 |

(Continued)

FOREIGN PATENT DOCUMENTS

EP    0395135    10/1990

(Continued)

OTHER PUBLICATIONS

Saini, H.;Kamal, R.; and Sharma, A.; *Web Based Fuzzy Expert System for Integrated Pest Management in Soybean*; International Journal of Information Technology; Aug. 2002; vol. 8, No. 1; pp. 55-74.

*Primary Examiner*—Daniel Wu
*Assistant Examiner*—Son M Tang
(74) *Attorney, Agent, or Firm*—James Creighton Wray; Meera P. Narasimhan (57) ABSTRACT

The present invention relates to an integrated method and system for preventing and solving problems relating to pests of any kind on a site, in a building, in a process, installation or in an area. The system involves complete digitalizing and automation of all functions necessary in order to control the pests such as surveillance, registration, alarms, regulation and remedial actions as well as generating reports etc. The aim is to make the overall effort against the pests more effective by means of fully automating all processes to the furthest possible extent.

15 Claims, 3 Drawing Sheets

U.S. PATENT DOCUMENTS

| | | | |
|---|---|---|---|
| 6,937,156 B2 * | 8/2005 | Gardner et al. | 340/573.2 |
| 7,020,996 B2 * | 4/2006 | Beroza et al. | 43/124 |
| 7,071,829 B2 * | 7/2006 | Gardner et al. | 340/573.2 |
| 7,239,720 B2 * | 7/2007 | Shima | 382/107 |
| 7,385,483 B2 * | 6/2008 | Lee | 340/384.2 |
| 2002/0107639 A1 | 8/2002 | Mafra-Neto | 702/5 |
| 2003/0069697 A1 * | 4/2003 | Mafra-Neto et al. | 702/2 |
| 2005/0025357 A1 * | 2/2005 | Landwehr et al. | 382/170 |
| 2005/0102889 A1 * | 5/2005 | Hoyes | 43/114 |
| 2006/0149509 A1 * | 7/2006 | Chyun | 702/189 |

FOREIGN PATENT DOCUMENTS

| | | |
|---|---|---|
| WO | WO 02/17119 | 2/2002 |
| WO | WO 03/084320 | 10/2003 |

* cited by examiner

PEST CONTROL SYSTEM

This application claims the benefit of Danish Application No. PA 2003 00890 filed Jun. 17, 2003 and PCT/DK2004/000418 filed Jun. 16, 2004, which are hereby incorporated by reference in their entirety.

BACKGROUND OF THE INVENTION

The present invention relates to an integrated method and system for preventing and solving problems relating to pests of any kind on a site, in a building, in a process, installation or in an area. The system involves complete digitalising and automation of all functions necessary in order to control the pests such as surveillance, registration, alarms, regulation and remedial actions as well as generating reports etc. The aim is to make the overall effort against the pests more effective by means of fully automating all processes to the furthest possible extent.

The effort against pests is necessary in that pests often pose a threat against the health and welfare of humans and livestock and may impose serious inconveniences as well as large material and cultural losses to society, households and industry.

The problems relating to pests arise especially when the pests are present in large numbers in forestry, agriculture or gardening. Especially when the pests are present in industry and institutions, in particular in the food stuff, pharmaceutical, health care or other high hygiene demanding sectors as well as in and around our houses.

The effort against pests must be effective, carried out in a systematic manner and be based on a wide spectre of experience and knowledge.

The Need for Pest Control in and Around Buildings

In a large number of establishments and institutions in sectors highly dependent on hygiene and therefore sensitive to pests, the problems of safeguarding against pests are far more complex than they are for plant crops. Besides economic consequences created by the presence of pests in items such as food, food containers, pharmaceuticals and the like, there is a serious risk of diseases being spread. In the industrialized world, pest-control is therefore a part of the statutory demands for, among others, theses lines of businesses. The purpose is to protect the population through among other things, a high degree of food safety.

This is compounded by a much greater species variation, from rodents, such as rats and mice, to thousands of various flying and crawling insects, a majority of which poses a safety risk. Feces from rats and mice may, for example, contain as much as a quarter of a million pathogenic bacteria per gram. The risk is serious, if infected foods end up on the dining table. Likewise, many of the highly mobile insects, including flies and wasps, act as carriers of pathogenic microorganisms from for example contaminated drains for food and other high-risk products.

Pollution prevention requires either the elimination of the source of pollution or the carrier, or the establishment of safe barriers between the source of pollution and sensitive products. The solution to pest problems must necessarily involve all levels of the product chain, i.e. when food is concerned, from farmers to retail stores via the processing industry, transport, storage and handling.

In many buildings, most of year or the whole year is pest season because a year-round climate, so to speak, is maintained, the easy access to food, water, as well as breeding areas is easy, and many pest species are almost omnivorous. Especially small pests will get in, in spite of all preventive measures, or they are brought in by infected deliveries coming from near or far.

Ensuring maintenance, cleanliness and tidiness, and, not least, remembering to keep a watchful eye are the key preventive elements.

Many establishments and institutions, e.g. in the food, health and nursing sectors, must adhere to stringent pest-control requirements, and are at the same time prohibited by law to use chemical pesticides indoors. Requirements regarding traceability and documentation are a key feature of intensified pest control.

Experience has shown that no preventive efforts will fully remove pest infestations, but by taking immediate action, the damage can be greatly limited.

In principle, "minute-by-minute" monitoring is needed in order to limit damages caused by pest infestation in an optimal way, whereby the need for more time-consuming and expensive remedies will be curtailed.

As with all other types of monitoring (e.g., monitoring of production processes and regarding theft and fire prevention), it is important to find means and methods that will increase the safety and unambiguity of collecting monitoring data, and that, on the other hand, will remove or minimize the need for a continuous human presence. Furthermore, when dealing with pest and hygiene control, experience has shown that the need for improving the quality of operations and the integrity of documentation required by authorities and customers is great.

An examination, analysis and evaluation of the actual situation at the site should precede any pest-control program, as should information about the location, previous pest activity, and users' preferences and requirements, objectives and critical limitations related to pest control.

In summary, in highly hygiene-dependent and pest-sensitive establishments and institutions, where problems are a lot more complex than in agriculture and gardening, effective pest control will require easy access to a broader span of professional expertise and methods, and making "zero-tolerance," early warning and immediate relief the key elements, when preparing operations.

STATE OF THE ART

Anti-pest efforts have generally been conservative. The most prevalent methods are chemical-based. An increasing incidence of resistance in pests has rendered several of the most common chemical agents completely of partially ineffective, and the presence of dead, poisoned animals in inaccessible or hidden places poses a great hazard to health and hygiene.

Due to low prioritisation and scarce resources, the monitoring of many locations is reduced to a minimum, where a few annual inspections provide only limited safety and control, and only outdated and inadequate information about the current pest situation. This is a poor foundation for an effective pest control, especially for establishments in the food and other sensitive sectors.

Especially in the industrialized world, there is a generalized and increased aversion towards the use of chemical pesticides that often adversely affect nature in several ways, and can be traced in foods, animal feedstuffs and drinking water.

Some agents have furthermore been prohibited, while only a few slip through the more stringent approval procedures.

A more restricted use of chemical agents in favour of biological and ecological methods and agents has put greater focus on such preventive measures that may prevent or minimize the consequences of pest infestations without actually resorting to pest control.

Pest Control Related to Outdoor Plant Crops

For outdoor plant crops, pest control runs the gamut of massive, "better-be-safe", chemical control to assisting plants naturally to resist attacks—for instance by selecting pest-resisting plant varieties, or ensuring healthy, naturally-resistant plants through optimal growth conditions in ecological balance so as to avoid or at least greatly limit actual pest control.

However, modern, plant-based production in agriculture and gardening is based on monocultures allowing the individual farmer to concentrate on one or a few crop-specific, pest species that may be relevant in relation to his crops. Attacks on "standing" crops will almost always be seasonal and generally occur during short periods (a few days or weeks) depending on the development stage of the crop in question.

Moreover, the consequences of pest attacks on plant crops will only have an economical dimension.

US2003/0069697 relates generally to pest-control systems and especially a method for controlling pests using detectors to identify pests and a network-related database, and specifically a method for pest control in crops of one or a plurality of plant growers using different identification sensors combined with computers, analysis and database software, as well as wireless or wired data transfers.

It mainly provides brief and basic descriptions of the structure, features and contents of the system solution that purportedly solves the significant, general problems raised in the background description of the above mentioned application.

In summary, these problems can generally be characterized as bottlenecks and poor information processing, for instance, as a result of the following:

Lack of reliable information due to inaccurate detection and interpretation of pest data Slow and delayed dataflow through multiple, manual stages The absence of common standards for critical limits and control measurements Besides disclosing a number of general methods and technologies, US2003/0069697, as indicated above, provides no specific instructions in terms of solving the above problems.

In contrast, U.S. Pat. No. 6,493,363 B1 discloses highly specific instructions for how to count and record insects (flying insects are implied) indoors, however, the solution lacks the very important and often-requested, species-determination option. Furthermore, this solution requires the presence of a high-voltage grid, whose main purpose is to eliminate (kill) flying insects when colliding with the grid. Due to the intensive release of voltage, the insects practically explode, and a profusion of fragments, often carrying germs, scatters over an area of various size, causing a hygiene hazard that is actually greater.

This solution can therefore be expected to gain less favour, as the use of adhesive plates trapping insects in an intact state and allowing for identification becomes the preferred choice.

SUMMARY OF THE INVENTION

Description of the Invention

A Through automation, the use of the latest technological achievements, especially within information technology, the present invention aims to optimise quality, safety and reliability of pest control in general, and minimize the need for manpower, overcome bottlenecks in the flow of information, and as a whole solve the problems outlined above.

The present invention addresses this by providing a pest control system comprising the following components:

one or more detection units, where each unit comprises means for identifying the type of pest and, optionally, the activity of that particular pest and further optional means for sensing physical factors which may correlate to that factor, and means for electronically communicating the collected data to a local server after encryption;

a local communication server, where the server comprises means for receiving input from the detection units and means for transmitting said input, optionally after encryption of data, and further optional means for processing and storing said input in an accessible storage medium;

a central system server, which may collect and treat data received from one or more discrete and/or remote local communications servers such that the treated data generates an output either as an alarm and/or as a log registration;

software modules incorporating self-learning in response to generated data and predetermined responses in view of incoming collected data.

One embodiment of the present invention relates especially to pest control in establishments and institutions in highly pest-sensitive sectors, such as the food, pharmaceutical, health and care sectors, and as regards residences. This embodiment uses one or more types of detection units.

The design of the detection units is adapted to the type of pest, the preferred identification data and the physical environment of operation. In some embodiments, the detection unit is attached to a capture unit. The individual detection units incorporate sensor(s) for detecting the activity and condition of pests, and also a microprocessor with software designed to transmit information electronically about detector-ID and detected activities and conditions.

As the pests may have different life patterns and damaging abilities, the invention in a further advantageous embodiment, when the pest is a rodent, provides that the detection unit comprises one or more of the following detection sensors: infrared temperature and/or movement sensors, mechanical tripping means, and further bait for attracting the particular rodent, optionally optical means in the shape of digital camera techniques as for example CIF, CCD, or VGA technology cooperating with suitable analysis and recognition software.

In a further advantageous embodiment, when the pest is an insect, the detection unit comprises one or more of the following detection sensors: infrared temperature and/or movement sensors, a plate member comprising a sticky surface arranged such that optical recognition means coupled to a reference database may scan the plate member or, alternatively, the plate member may be placed in a scanner for data collection, or as a further alternative the plate member may be combined with digital camera techniques as for example CIF, CCD, or VGA technology cooperating with suitable analysis and recognition software, a source of UVA blacklight and/or a source of pheromone or a source of bait.

By the term "insect" all flying and non-flying insects shall be construed which may cause harm as described above.

The control system, in a further advantageous embodiment, may be provided with means for exterminating pests in the detection unit. As the object is detecting the pest and controlling the pest, it is often advantageous to combine the detection unit with the extermination unit such that the pest is exterminated as it is discovered, and also, for control purposes, it might be advantageous to be able to collect samples of the pest and correlated these with the data collected from the detection unit.

Besides detecting actual pests, it may be of relevance in many situations to detect traces of the presence of pests.

The detection units are linked either by wire or wirelessly with a local communication server that acquires, processes and transmit the information from the detection units to a "global" system server with a database.

The link between the detection units and the local communication server may be wired, however, the preferred embodiment uses some type of wireless link. The communication is done encrypted to prevent interference with other wireless systems at the site. Among the specific technologies for wireless local communication, Wlan (the 802.11 standard) or Bluetooth was used for tasks requiring large bandwidth and 433 Mhz or 866 Mhz radio frequency for jobs requiring a relatively larger operational range.

The link between the local communication server and the "global" system server, i.e. the central system server, in this preferred embodiment is established via GSM/GPRS and the Internet; but may also be done via LAN and the Internet.

The above mentioned electronic communication possibilities provide, in a further advantageous embodiment, that the system further comprises means for transmitting a status report on the current status of the detection unit at predetermined time intervals, and, additionally, is capable of transmitting alarm signals if/when action (activity) is detected in the detection unit.

The access for users and service operators to the "global" system server is mainly done via an Internet link. The "global" system server is equipped with software (established and self-generating decision models) for fully automated control and monitoring of dataflow, including access control, analysis and evaluation of activity and status data, diagnostics, and the emission of alerts and reports.

The "global" system server is furthermore associated with a database containing, among other things, information about connected users and user locations, service providers and other specialists, as well as "expert-system data".

The collection of data in a further advantageous embodiment provides the extra advantage that the central server comprises a database where data from the detection units as well as actions in response to such data is stored, and that the data by means of suitable software may be used in order to predict possible causes of presence of pests, causes of alarm and/or suggest possible actions, and that the collected data is correlated and integrated with the database.

As already described above, due to the construction of the detection unit as well as the construction of the entire control system, it is important that communication is established between the different locations and also between the different protection unit placed at one location. For this purpose, in a further advantageous embodiment, the communication between the components in the system takes place via wireless means such as for example GSM or GPRS, or via wire, such as for example LAN network, internet, or especially dedicated wiring.

In a still further advantageous embodiment of the communication set-up, the wireless means may comprise Blue tooth technology, Wlan or traditional wireless transmission of data.

B Position control. At an individual location, the system may be enhanced by radio-signal-based localisation technology in order to determine and control the positions of the detection units at that location. The majority of the detection units are battery-powered and communicate wirelessly, which may involve a certain risk at some locations of unintended movement away from the positions recorded in the system. Correct location indication for each individual activity/status is critical in order to perform correct analysis and diagnosis, and thus for the automatic responses of the system in the form of e.g. emitting alerts, prevention instructions and other feedback. Position control is done continuously as part of general protection control, accordingly, all detection units should automatically transmit an "alive and well" control message at fixed time intervals.

For these purposes, the invention in a further advantageous embodiment provides that the one or more detection units, and/or the local communication server, comprise a Local Position System unit or a GPS unit, which LPS or GPS by means of the communication means may convey the components' position.

C Detection methods. To detect pests or traces after pests and to determine species, their numbers and size, etc., an immense variety of technologies and techniques are being employed. Different types of sensors, each operating on the basis of one or several electrophysical, mecanical, biotechnical and biochemical measuring principles are used individually or in situation-specific combinations. For instance, it is possible to measure light, temperature, smell, sound, weight and length. In relation to the preferred embodiment of the invention, special light and techniques associated therewith (e.g. photocell, IR, UR and diffuse light), computer-supported biochemical and chemical analyses, as well as digital camera technique combined with computer-based image analysis and pattern recognition are used.

1) Activity detection is primarily used for single species in areas with zero tolerance towards the relevant single species, and where immediate automatic or manual prevention efforts are needed. Automatic relief takes place, e.g. when a detection unit is installed in a trap and provides direct capture release, see EP 98919083.0. Activity detection generally uses units that directly measure changed conditions, i.e. changes of a measurable factor, such as light, temperature, weight or similar physical factors used for motion detection.

2) Status Detection detects and records relevant physical, chemical and biological factors to be used in fully or semiautomatic analysis and diagnosis. The status detection is either activity/motion-controlled or time-controlled. More complex tests, e.g. when species determination and number of insects are concerned, require more nuanced situation images. Here, modern digital camera technique is used based on CIF, CCD or VGA technology combined with special image analysis and pattern recognition software, which is known from analyses of complicated biological subjects such as insects and plant seeds, when identifying single individuals through biometric codes.

Multispectral analysis (as disclosed in WO9942900) is used in cases when diagnosis requires recognition of colours or surface structures of pests or traces after pests.

D The "global" system server may be extended, e.g. in order to ensure optimal access and operational conditions, with an Internet-based network of regional and national communication servers containing the necessary software and databases.

The "global" system server with associated database contains all the system's information and operation software (including some artificial-intelligence-based, self-generating features) and is shared by all user establishments and service operators making possible a high degree of experience exchanges and common learning and utilization of recent knowledge for the benefit of all that are connected worldwide.

The self-generating features ensure continuous automatic updating and expansion of the "expert system database". Continuing correlation analysis are done on all detected data, e.g. in order to reveal new correlations between the occurrence of pest species and control methods, geographic, cultural and national areas, industrial sectors, etc. The system therefore slowly becomes more intelligent, as time progresses.

E The system includes a series of computer-supported features and activities related to start-up, operation and maintenance of optimum integrated pest control.

1) Status and risk analysis, (Hazard analysis and assessment) which is done at start-up and periodically as part of an integrated pest control program at a location. The analysis comprises a physical review and recording state of all relevant things at the location, a review of the specific requirements of users and authorities, the previous pest burden, etc.
2) A needs evaluation which is done in co-operation with users, comprises a specific risk assessment of the various areas at the location, determination of critical limits for pest activity and the use of chemical agents, as well as the determination of pest-control targets and what's required in terms of individual user efforts.
3) Pest-control planning. Allocating the number and density of detection and capture units, the alert addresses, the number and frequency of continuous and periodical, automatic and manual inspections and reporting.
4) Start-up and running-in the system, including implementation of e-learning programs for those user representatives, who will become involved in the current operation and maintenance of the system.
5) System operations, whereby current (daily) operations are done automatically, and only a few sporadic and periodic activities, wholly or partially, are done manually.
   a. Monitoring is done completely automatically, as detection units transmit the relevant information to the pest-control database. Transmission is done in a timer-controlled fashion, or when pest activity is detected, or when the set status level is exceeded, either directly or through a local communications server to the database in the "global" system server. Monitoring also involves a periodical check of all detection units that they are "alive" and in a correct physical position. Monitoring may also involve continuous recording of several physical conditions that may influence the pest activity, e.g. temperature, air humidity, light
   b. Automatic analysis and diagnosis is done continuously in the "global" server system based on the detected, incoming data. This involves real-time "minute by minute" recordings, making it possible to load a completely updated image of the pest situation and the latest development, e.g. exactly where and when a pest attack began, how it developed, and where its cause may be found at any time.
      Combining real-time recording of the individual activities and status makes it possible to present an image of the dynamics of pest activity and its association with a number of environmental factors relating to this activity.
      In order to analyse recorded data, a self-adaptive system is used, which has been taught in advance to "recognize" the most prevalent pest species and pest-occurring situations that can be anticipated, and which continuously expands the collection of known species with new species and situations, as they occur.
   c. An alert is emitted, if critical limits are exceeded. Alerts are transmitted to one or several pre-dedicated addresses (e.g. www, e-mail, cell phone or landline telephone). As a general rule, an alert is always followed by a report with the relevant corrective instructions and recommendations or detailed queries about the actual, critical situation.
   d. Reporting, with situational and targeted form and content, is automatically included in an alert message and occurs at fixed intervals or upon request.
   e. Manual and semi-automatic operational features enable the recording of past inspections and corrective/preventive actions, as well as monitoring data and other results of manual interventions. In addition, any false recordings may be corrected manually, although deletion of previous recordings is not possible.
   f. Mobile detection and data capture. The system may also comprise mobile units for manual and semi-automatic data capture, as well as communication software that enable secure, mobile determination of species and their numbers through analysis software located in the "global" system server.
6) Expert system and databases are the key elements of the system
   a. General Database
      1. Standards and specific expert knowledge related to ensuring detection and elimination of any type of pest. This includes service and a support centre.
      2. Decision models
      3. Models and other software, including self-adaptive, "artificial intelligence"-based software for the determination of species and their numbers, e.g. using image analysis and pattern recognition.
      4. General standards for setting up a system, including risk-classification of locations and determination of risk factors, critical limits and measurements, corrective options, etc.
   b. Individual Databases (for Operators, Users and Locations)
      1. Access control
      2. Risk/status analyses
      3. Protection plans with established risk factors, critical checkpoints, individual measurements and critical limits, etc.
      4. Corrective actions in case of critical variations
      5. Logs showing inspections, monitor recordings and alerts, as well as corrective/remedial actions, including reports.
   c. Communication Software for Automatic Alert and Data Transfer System Description Example 1. General System Information
   GreenTrapOnline presentation 2. Service Operators Room
   1) Login
   2) Database and documents frames (standard)
      a) Risk and State Analysis in accordance to a Food Safety Standard and/or specific individual demands
      b) Safety Scheme
         i) Plans for risk classified areas including detection and capturing devises
         ii) Critical Control Points and Risk Faktors
         iii) Target levels and critical limits iv) Corrective Actions to take in case
c) Logbook
  i) Monitoring Critical Control Points
  ii) Alarms
  iii) Corrective Actions
3) Legislation, Rules and Standards
a) Pest Control
b) Food and pharmaceutical Safety etc
c) Hygiene 3. Customers Room
  1) Login
  2) Database for Each Customer/Location
  a) Risk and State Analysis in accordance to a Food Safety Standard and/or specific individual demands
  b) Safety Scheme
  c) Safety references (customer specific)
  d) Plans for risk classified areas including detection and capturing devises
  e) Critical Control Points and Risk Faktors
  f) Target levels and critical limits
  g) Corrective Actions to take in case
    i) Logbook
    ii) Monitoring Critical Control Points
    iii) Alarms given
    iv) Corrective Actions taken
3) Knowledge Database
  4) Login
  5) Expert System
  a) Knowledge about
    i) Pests
    ii) Prevention
    iii) Buildings and installations techniques
    iv) Methods, means and remedies
    v) Food safety standards
    vi) Pest control standards
    vii) etc
  b) Standard models and programmes
    i) Mathematic models and self-learning, "artificial intelligence" based programmes for recognition comparison of patterns and images
    ii) Programmes for diagnosing and handling incoming data and for dynamic hazard analysis
    iii) Programmes for handling databases, front pages, dialogue windows etc
    iv) Programmes for communication
    v) etc Below the system will be further elaborated with reference to the accompanying drawing wherein

DETAILED DESCRIPTION OF THE PREFERRED EMBODIMENTS

Specific Examples of how to Set Up and Operate a GTO System

Since many of the current operational and maintenance issues at the user establishment greatly affect the occurrence of pests at the site and thereby derived harmful effects and risks, all activities related to both implementing and operating a pest-control system are always performed by involving of representatives of the user establishment.

Setting Up

Status and Risk Analysis (Hazard Analysis and Assessment)

An inspection and review of all factors and circumstances of relevance for pest protection at the user's establishment must precede the establishment of a pest-protection program. All facts are analysed and a subsequent needs evaluation will produce a specific, useful pest-protection plan.

Protection Plan

A pest protection plan involves identified risk areas, critical inspection points, various critical elements (pests, activities and status), as well as determining the number of detection and capture units to install, contents and frequency of ongoing and periodical, automatic and manual inspections, including correction, alerting and reporting procedures.

Start-Up

Start-up comprises both the physical set-up and tests, as well as the establishment of user-specific database sections (user folders) with the required access certificates, etc. Further, e-learning programs for user representatives with access via the Internet are established.

Figure 1:
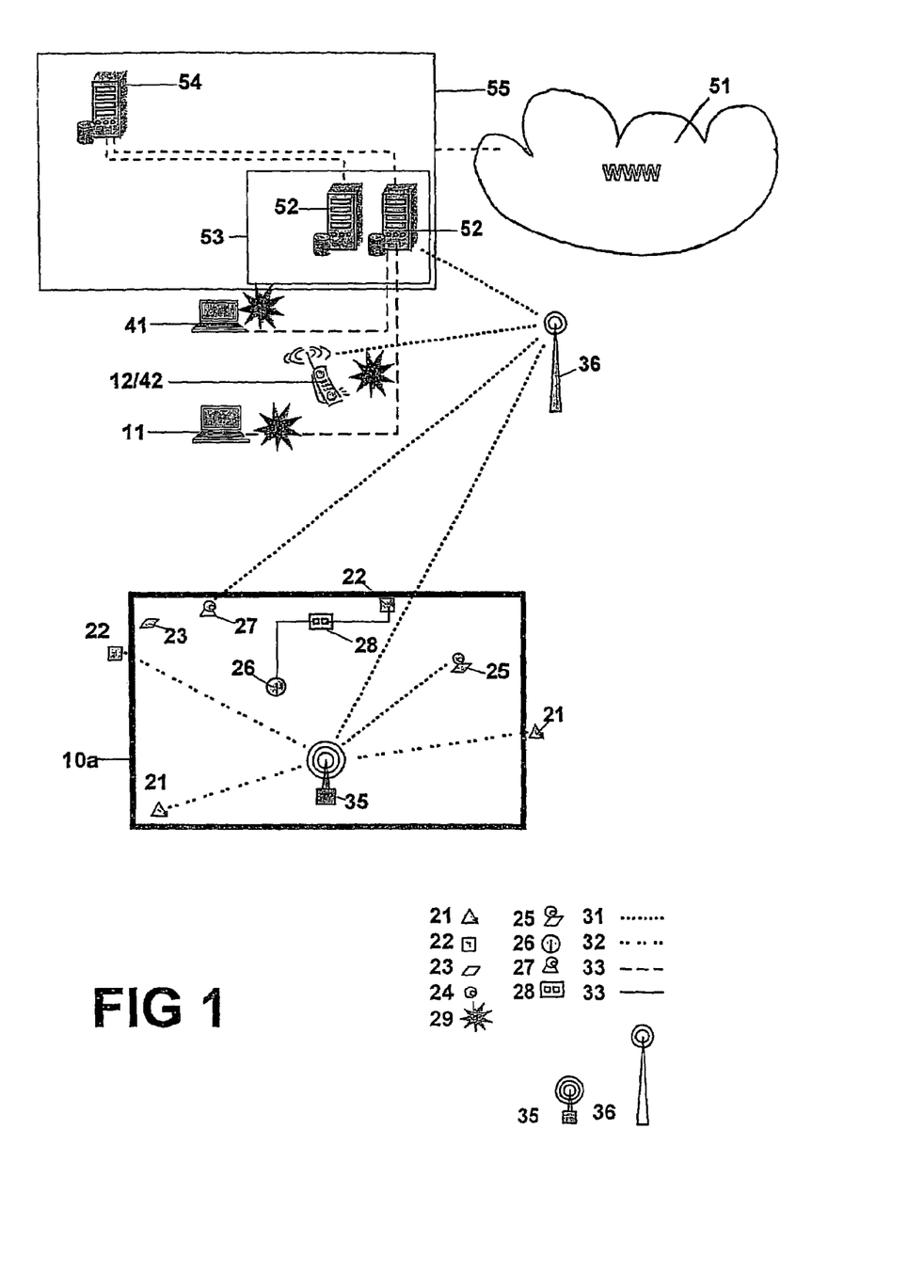
FIG. 1 illustrates a general layout of an exemplified system installed for pest control.

FIG. 1 illustrates a principle pest control solution on a site (10) e.g. in a building, in a process, installation or in an area.

Inside and outside the area (10), an appropriate amount of detection units and capture units (21, 22, 23, 25, 26) are placed. They detect pest activity, detection errors and related physical conditions, such as temperature and humidity.

The units (21, 22, 25, 26) each transmit, when a critical activity takes place or at fixed time intervals, an encoded message to the "global" system server (54). The units (21, 22) are connected with the "global" system server through a radio link (32) and a local communication server (35). The detection and capture unit (25) is connected (31) through an incorporated GSM module with the "global" system server (54) through a GSM link station (36). The detection units (22, 26) are connected via a wired LAN (28)/Internet link (33) with the "global" system server. The detection unit (27) is a digital camera/GSM module for mobile data acquisition and supplying data directly to the central server.

When individually preset critical limits are exceeded or critical conditions occur, the "global" system server emits alert messages to pre-dedicated alert addresses (29).

Operational Example 1

Rodent Protection for Pharmaceutical Merchants

Monitoring

Figure 2:
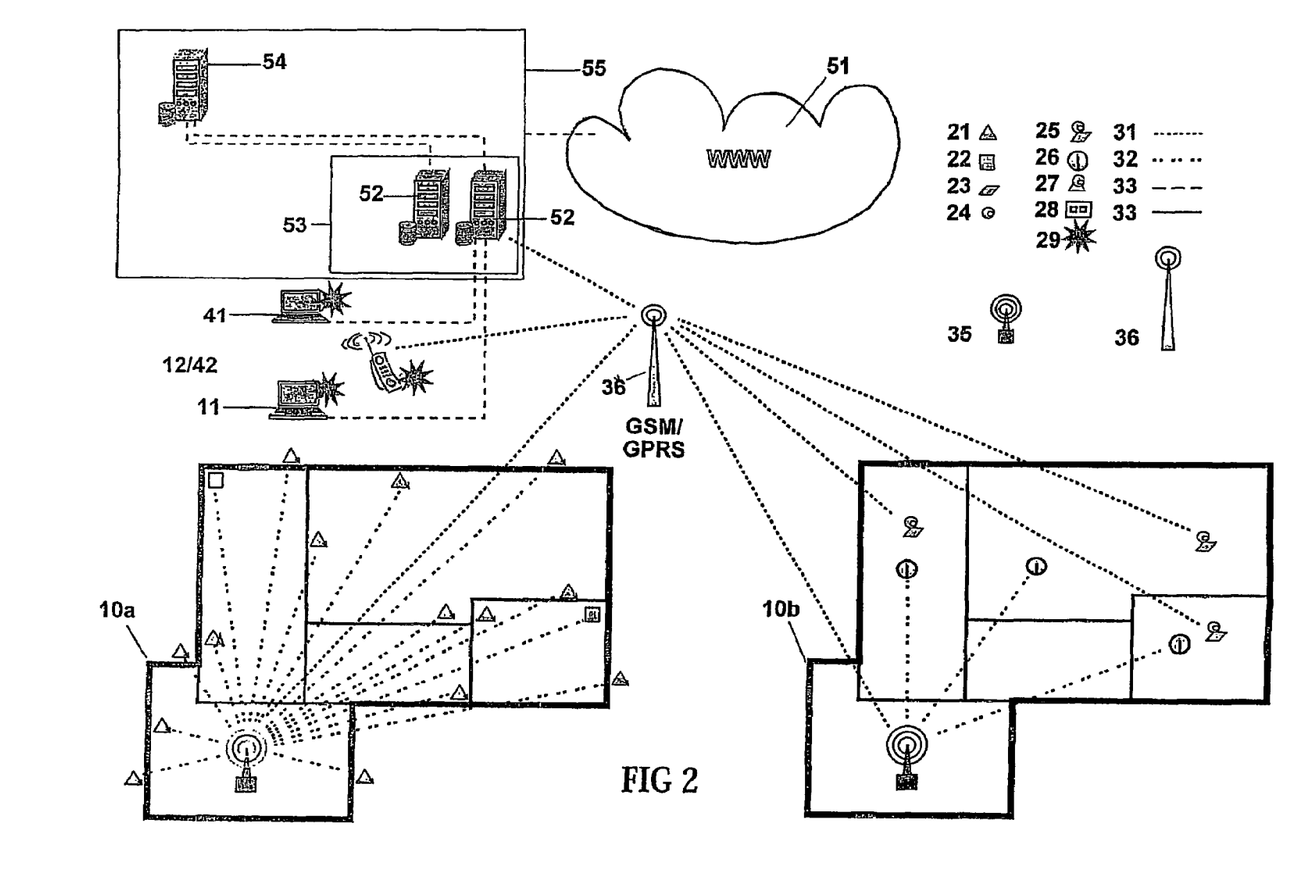
FIG. 2 illustrates an expanded system comprising an installation for pests in the shape of rodents and further an installation at a bakery where the main pest is in the shape of flying pests, FIG. 3 schematically illustrates the communication routes of the system.

In the specific solution at area (10*a*) as illustrated in the left hand part of FIG. 2, a number of detection units (21, 22) as well as capture units with attractant for rodents are set up. The rodent units (21, 22) are provided with IR-based motion sensors in order to detect rodent activity, radio emitter/receiver for communicating with the "global" system server (54), as well microprocessor control. The units (21, 22) are programmed to emit an OK (alive) message, three times over a period of 24 hours, and immediately provide a message about "sensed" rodent activity. All messages are accompanied by the relevant unit's ID code.

The rodent units (21, 22) communicate with the "global" system server (54) through a local communication server (35) that stores and evaluates received data, which is retransmitted to the "global" system server (54), when critical limits are exceeded, and/or automatically three times over a 24-hour period. The communication server (35) is wirelessly connected (32) with the detection and capture units (21, 22) and via an integrated GSM module (31) with the "global" system server (54) through a GSM link station (36).

Operational Example 2

Insect Protection in a Bakery

At the bakery (10*b*), as illustrated in the right-hand part of FIG. 2, a number of adhesive plate traps (23) are suspended. Some with UVA blacklight, a special 365 nm light which attracts a broad range of flying insects. Other have a species-specific attractant (pheromone). The insects get caught and remain at the adhesive plate. For each of the insect traps, a programmable combined camera/GMS module (25) is mounted at a controlled distance. In this solution, the camera/GSM module is set to once over a 24-hour period take a high-resolution image of the whole adhesive plate, and subsequently transmit the image via a GSM link station (36) as an MMS message to a coded address being the appropriate user's database section in the "global" system server (54). Here, the image is analysed, compared with the latest previous image taken from the same position, and any newly arrived insects (including their species and number) are recorded.

In an especially sensitive area, two small adhesive-plate traps (23) with a pheromone-based attractant for the moth species plodia and ephestia are suspended exclusively for the purpose of detection. They also have a motion-triggered camera/GSM-module (24) attached, as mentioned above.

Most insects' development is dependent on the temperature and moisture at the location, which is why room temperature and humidity is measured continuously with the sensors (26) in every room of the building. Measuring data are transmitted once per hour to the communication server, where it is recorded and transmitted along with the next outgoing data packet to the "global" server (54). Temperature and humidity data will become part of the total diagnostic basis.

For mobile acquisition/recording of pest data, a mobile, handheld unit with an integrated camera/GMS module (basically as in 24) is placed at the user's location. This mobile unit is used in combination with software in the "global" server for any presence of pests determined sporadically or during routine, manual inspections according to a protection plan.

Common Features of Operational Examples 1 and 2

FIG. 2 illustrates the option of a combined system comprising systems with different combinations of detection units (21,22,23,24,25,26,27) for collecting different data. All manual activities, including routine, periodical inspections and other activities immediately related to pest control, are recorded via Internet access (33) of the computers (11,41) to the "global" system server (54). This may involve changes in the physical placement of detection units, switching adhesive plates in insect traps, change of batteries, renewal of baits, emptying rodent traps, and so on.

Figure 3:
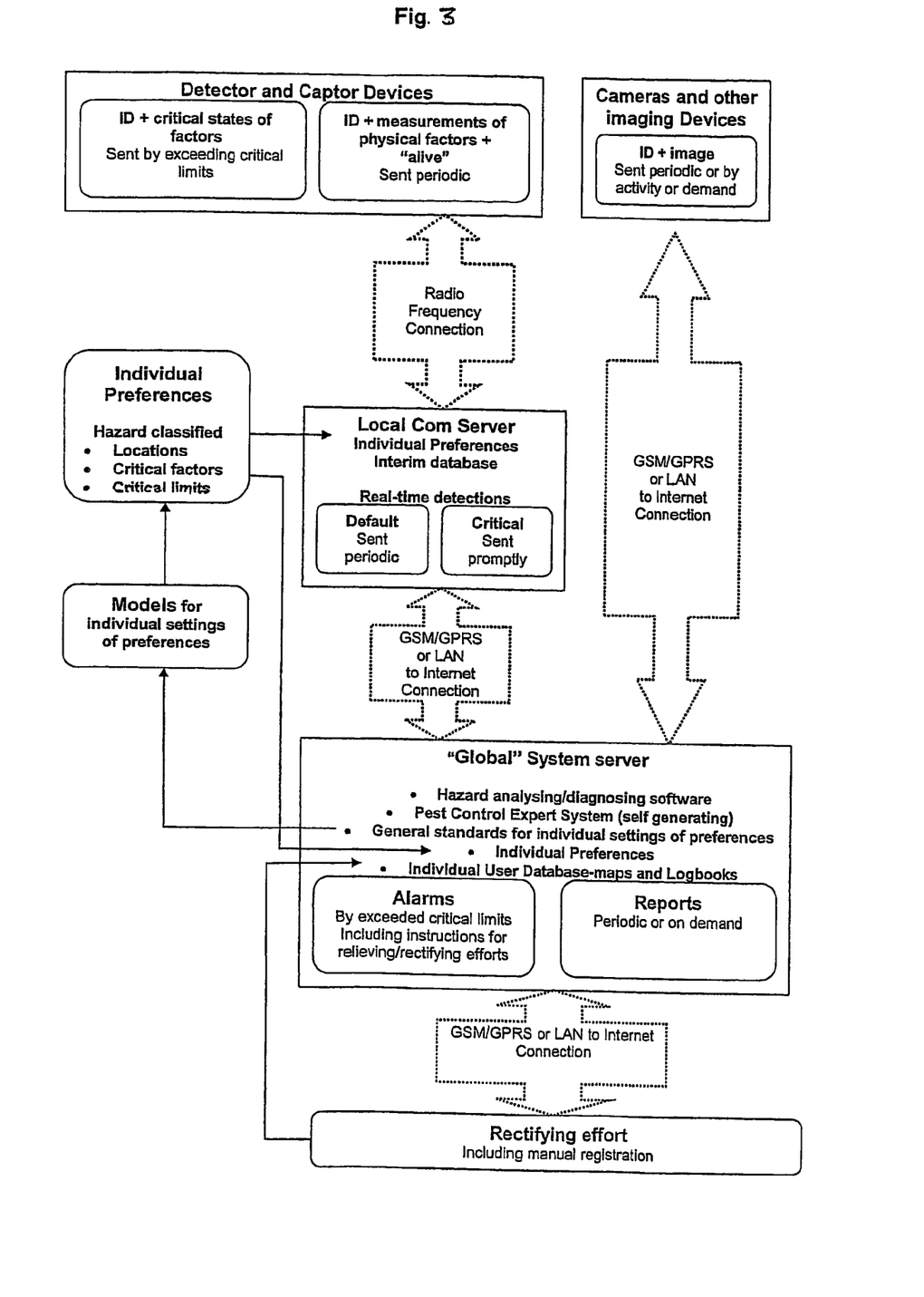

In FIG. 3, a general schematic plan for a system configuration, also indicating different lines of communication, is illustrated.

Analysis, diagnostic testing, and alerts. The loaded activity and status data are continuously analysed and assessed based on the criteria outlined in the protection plan. If the set critical limits are exceeded, an automatic alert and a corrective instruction are emitted; in full compliance with the protection plan.

Corrections may be done automatically as a first immediate step in a series of corrective actions. In pest elimination, this is done prior to detection, when insects are concerned, and directly after the detection being triggered, when rodents are concerned.

Reporting. Reports are automatically printed (recurrently or when an alert goes off), or per request Log. All monitoring data, emitted alerts and immediately performed corrections and other corrective actions, as well as reports are compiled in a log.

TABLE 1

10 = Secured against Pest Area
10 a = Secured against Pest Area, Medical Groser
10 b = Secured against Pest Area, Bread Industry
11 = Users Computer
12/42 = Users and operators phone
21 = Detecor Unit for Rodents
22 = Captor Unit for Rodents
23 = Sticky Glueboard Trap for Insects
24 = Digital camera/GSM modul
25 = Combined Glueboard/Camera/GSM Unit
26 = Detector for physical factors (e.g. temperature, humidity)
27 = Mobile digital camera/GSM modul
28 = Cabled network connection (e.g. LAN to Internet)
29 = Alarm address
31 = Global wireless connection (GSW/GPRS)
32 = Local wireless connection (e.g. 433/866 MHz, Bluetooth, WIan)
33 = Internet connection
34 = Cable connectIon
35 = Local Communucatlon server
36 = GSM/GPRS Link
41 = Service Providers Computer
51 = Internet
52 = National Communication, and SystemServer
53 = Regional Communication Network
54 = Central Server
55 = Central Server Network

The invention claimed is:

1. A pest control system for controlling various types of pests including rats, mice and other rodents, comprising the following components:
one or more detection units, where each unit comprises
means for collecting data identifying the type of pest and
means for electronically communicating the collected data relating to pest activity and type of pest to a local server after encryption;

a local communication server, where the server comprises means for receiving input from the detection units and means for transmitting said input after encryption of the collected data;

a central system server, which collects and treats the collected data received from one or more discrete and/or remote local communications servers such that the treated collected data generates an output either as an alarm and/or as a log registration;

software modules incorporating self-learning in response to the generated data and generates predetermined responses in view of the incoming collected data.

2. The control system according to claim 1, wherein the detection unit, when the pest is a rodent, comprises one or more of the following detection sensors: infrared temperature and/or movement sensors, mechanical tripping means, and further bait for attracting the particular rodent, or optical means in the shape of digital camera technology cooperating with suitable analysis and recognition software.

3. The control system according to claim 1, wherein the detection unit, when the pest is an insect, comprises one or more of the following detection sensors: infrared temperature and/or movement sensors, a plate member comprising a sticky surface arranged such that optical recognition means coupled to a reference database for scanning the plate member or, alternatively, the plate member placed in a scanner for data collection, or as a further alternative the plate member combined with digital camera technology cooperating with suitable analysis and recognition software, a source of ultraviolet blacklight and/or a source of pheromone or a source of bait.

4. The control system according to claim 1, wherein the system further comprises means for exterminating pests in the detection unit.

5. The control system according to claim 1, wherein the system further comprises means for transmitting a status report on the current status of the detection unit at predetermined time intervals, and, additionally, transmits alarm signals if/when activity is detected in the detection unit.

6. The control system according to claim 1, wherein the central server comprises a database where data from the detection units as well as actions in response to such data is stored, and that the data by means of suitable software is used to predict causes of presence of pests, causes of alarm and/or suggest responsive actions, and wherein the collected data is correlated and integrated with the database.

7. The control system according to claim 1, wherein that communication between the components in the system takes place via wireless means or via wire.

8. The control system according to claim 7, wherein the wireless means comprise GSM or GPRS.

9. The control system according to claim 7, wherein the wire comprises LAN network, internet, or dedicated wiring.

10. The control system according to claim 1, wherein wireless means comprise Blue tooth technology, Wlan or traditional wireless transmission of data.

11. The control system according to claim 1, wherein one or more detection units, and/or the local communication server, comprise a Local Position System unit or a GPS unit, which LPS or GPS by means of the communication means may convey the components' position.

12. The control system according to claim 1, wherein the means for identifying the type of pest also identifies the activity of that particular pest.

13. The control system according to claim 1, wherein each of the one or more detection units further comprises means for sensing physical factors which may correlate to that factor.

14. The control system according to claim 1, wherein the local communication server further comprises means for processing and storing said input in an accessible storage medium.

15. The control system according to claim 1, wherein the means for identifying the type of pest comprises a digital camera and software programmed on the central system server for image analysis or pattern recognition.

* * * * *